April 12, 1927.
E. G. HEINZELMAN
1,624,598
STEERING WHEEL BRAKE
Filed Aug. 27, 1923
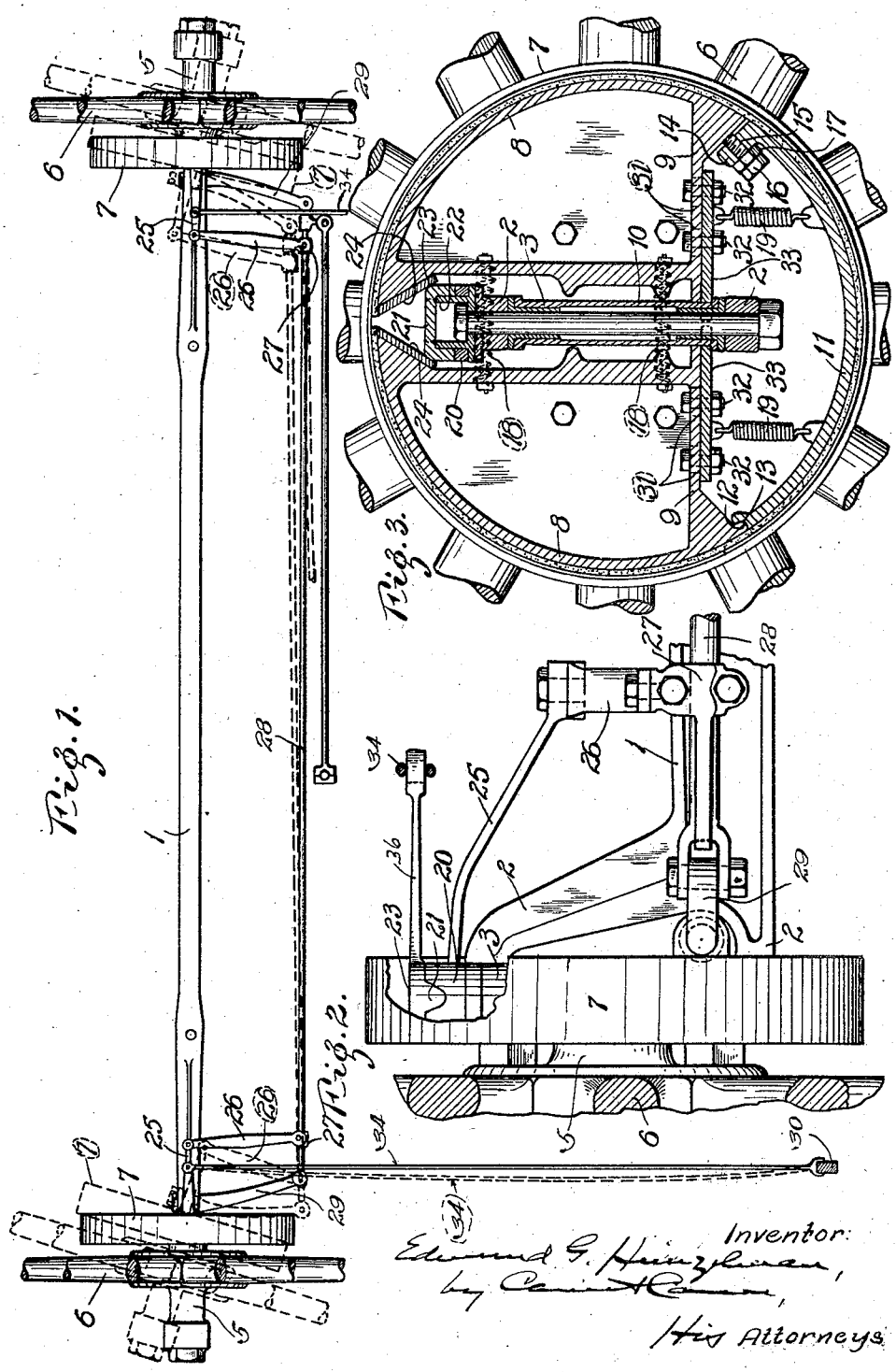
Inventor:
Edmund G. Heinzelman,
by
His Attorneys Patented Apr. 12, 1927.

UNITED STATES PATENT OFFICE.

EDMUND G. HEINZELMAN, OF BELLEVILLE, ILLINOIS.

STEERING-WHEEL BRAKE.

Application filed August 27, 1923. Serial No. 659,520.

According to present practice in the construction of automobiles the spindles of the front wheels are integral with knuckles that are pivotally mounted in the forked ends of the axle bridge so as to permit the wheels to be turned at an angle to the longitudinal axis of the automobile for the sake of changing the course thereof. For various reasons, it is desirable to mount brakes on the front wheels; but, while the vehicle is turning, there is objection to braking the outer wheel. The purpose of the present invention is to devise front wheel brakes and means for operating the same which will permit both brakes to be operated simultaneously when the vehicle is moving straightaway and which will permit the brake of the inner wheel to be set and at the same time render the brake of the outer wheel inoperative when rounding a turn. The invention consists principally in a brake that is mounted to swing with the steering knuckle. It also consists in means for operating the brakes said means comprising counterpart cam members both rotatably mounted to turn with the steering knuckle and one of them having an arm that is connected by a link with the cross rod of the steering gear whereby said cam member shifts its position with the shifting of said cross rod without affecting the operative relation of the cam members to each other. It also consists in equipping the brake actuating arm with a cable or other flexible or lost-motion connecting member for connecting it to the foot lever or other controlling device so that said cable will remain taut and in operative condition to respond to said foot lever when the wheel is turning outwardly and will slacken and become inoperative to work the brake when the wheel is turning inwardly. It also consists in the constructions and arrangements of parts hereinafter described and claimed.

In the accompanying drawing, wherein like reference numerals refer to like parts wherever they occur, Fig. 1 is a plan view of the front axle of an automobile with the road wheels and steering gear shown in different positions by dotted lines;

Fig. 2 is an elevation showing a brake embodying my invention applied to a steering wheel; and Fig. 3 is a vertical section through such brake parallel with the wheel.

Referring to the accompanying drawing, 1 represents the body of a front axle of ordinary type; 2 represents the forked end thereof; 3 represents a common type of steering knuckle pivotally mounted in said fork on a substantially vertical axis and having a substantially horizontal spindle 5 upon which is rotatably mounted the road wheel 6. This road wheel comprises a hub portion having a circumferential flange and spokes that are clamped between said flange and an annular clamping plate provided therefor.

According to the present invention, the steering wheel is provided with a brake drum 7, preferably by bolting it to the spokes, concentric with the axis of the spindle. The brake comprises a pair of counterpart castings 8 each of which has an arcuate portion constituting brake shoes of a length of about 120°, the adjacent ends of these brake shoes lying near the axis of the knuckle pin and having bearing surfaces for cooperating with the cam member hereinafter mentioned. The bottom portions of the castings are substantially horizontal and terminate in recessed or yoked ends 9 that straddle the sleeve 10 of the steering knuckle.

For the sake of making said shoes adjustable, the lower wall of each casting has formed therein elongated slots (indicated by dotted lines at 31 in Fig. 3) for bolts 32 that pass through and support plates 33 whose inner ends extend flush with or beyond the inner corners of said brake shoe castings and constitute the pivotal centers thereof. A third brake shoe 11 is mounted on the brake shoes above described. For this purpose, the lower end of one of said first mentioned brake shoes has its lowermost end 12 rounded off to form a fulcrum or bearing; and over it fits a recess 13 in one end of the third brake shoe. The other end of said third brake shoe is provided with an inwardly extending lug or ear 14 which has a threaded hole 15 therein substantially perpendicular to the radius of the brake drum. In this threaded hole is a set screw or abutment screw 16 whose projecting end bears against the lower end of the adjacent brake shoe of the first mentioned pair. A lock nut 17 is provided to hold the abutment screw in adjusted position. By this arrangement, the lower ends of the first mentioned pair of brake shoes form abutments for the third or intermediate shoe; and when said upper brake shoes are moved against the end of said third or intermediate brake shoe, they force it against the brake drum.

The brake shoes are provided with suitable tension springs 18, 19 for pulling them from the brake drum and holding them in normal position. Horizontal tension springs 18 are attached to the inner vertical portions of the first mentioned pair of brake shoes so as to cause their adjacent ends to normally approach each other; and vertical tension springs 19 extend from the lower brake shoe to the horizontal mounting member. By this arrangement, pressure endwise against the ends of the first mentioned pair of brake shoes tends to separate such ends and force the said shoes against the brake drum. The movement of the brake shoes is of a pivotal character, with the axis of rotation of each shoe near its lower inner corner; that is, while the adjacent ends of said shoes spread apart horizontally, the lower outer ends of said shoes are moved downwardly, thus not only causing the upper shoes to engage the brake drum but also transmitting pressure against the ends of the third or intermediate brake shoe and causing it also to engage said brake drum.

The means for applying pressure to the ends of the brake shoes comprise an annular cam 20 that is mounted on the top fork of the yoke of the axle concentric with the knuckle pin and having its upper surface formed into one or more cam teeth. The counterpart cam member 21 is also of annular shape and is mounted above and concentric with said first mentioned cam member. This upper or second cam member is in the form of a hollow cylinder with a radially disposed brake actuating arm 36. This upper cam member is centered by means of an annular sleeve 22 with an inwardly projecting annular flange against which the head of the knuckle pin is firmly clamped. The outer upper edge 23 of the second cam member is rounded off and constitutes a bearing for cooperation with the sloping or inclined ends 24 of the brake shoes so as to cause spreading movement thereof when forced upwardly.

The lower cam member 20 has a radial horizontal arm 25 that is fixed thereto or integral therewith and extends inwardly with respect to the vehicle. Pivotally connected to the inner end of this arm is a link 26 whose other end is pivotally connected to a bracket 27 provided therefor on the cross rod 28 of the usual steering gear construction, the distance of its point of connection being less than the length of the arm 29 of the steering knuckle 3 so that although the cam member 20 will turn with the knuckle 3 it will not turn to the same extent. By the arrangement above described, the brake drum and the brake shoes swing on the same axis with the wheel and therefore maintain their operative relations in all angular positions of the wheel.

As for the means for operating the brake, it is noted that when the upper cam member is turned relative to the lower cam member, the result is to cause said upper cam member to ride upwardly on the lower member, that is, radially with respect to the spindle, and thereby bear against and spread apart the ends of the brake shoes, as hereinbefore described. As it is desirable, in making a turn, to have the outer wheel free, while the inner wheel remains responsive to the brake actuating mechanism, the connection between the pedal or foot lever 30 and the brake actuating arm 36 is made by means of a cable 34 or other suitable flexible member or lost motion device. When the wheel is turning outwardly (by which is meant the turning of the right hand wheel to the right or the left hand wheel to the left) the link attached to the cross rod of the steering mechanism causes the arm of the lower cam to swing and thereby turn the lower cam in the same direction and nearly to the same amount as the sleeve of the steering knuckle when the wheel is turning either outwardly or inwardly; and as the upper cam member turns with said knuckle, there is little or no relative movement of the two cam members, at least not sufficient movement to operate the brakes. In the case of the wheel turning outwardly, the cross rod of the steering gear moves forwardly with relation to the axle, as indicated in dotted lines, and thus tends to swing the brake actuating arm 36 forwardly and lengthen the distance between said arm and the operating pedal 30; in other words, it tends to keep the cable or flexible member taut or to increase the tension thereon. The effect is to keep the brake responsive to the foot lever while the wheel is turning outwardly.

On the other hand, when the wheel is turning inwardly, the cross rod of the steering gear moves backwardly swinging the brake actuating arm backwardly with it and thereby shortens the distance between said arm and the operating pedal and thus, as indicated diagrammatically by the curved dotted lines, slackens the cable that transmits the power of the pedal to said cross rod. In other words, on account of the slackness of such cable, the brake becomes irresponsive to the pedal or actuating lever while the wheel is turning inwardly.

What I claim is:

1. The combination, with an automobile having steering wheels mounted on swinging spindles and steering mechanism therefor, of brakes movable with said spindles and means for operating said brakes, said means comprising arms extending inwardly from the spindles and movable therewith and flexible members connecting said arms to an actuating lever, said arms being movable independently of their spindles respectively and means operatively connected to the steering mechanism to be controlled thereby for rendering the brake of the outer wheel irresponsive to said actuating lever when turning.

2. The combination, with an automobile having steering wheels mounted on swinging spindles and steering mechanism therefor, of brakes movable with said spindles and means for operating said brakes, said means comprising arms extending inwardly from the spindles and movable therewith and lost motion devices connecting said arms to an actuating lever, said arms being movable independently of their spindles respectively and means operatively connected to the steering mechanism to be controlled thereby for rendering the brake of the outer wheel irresponsive to said actuating lever when turning.

3. The combination with an axle having steering knuckles pivotally mounted thereon and wheels journaled on the spindles of said knuckles of brakes for said wheels respectively, each brake comprising a drum mounted on the wheel and brake shoes mounted to turn with the steering knuckle in operative relation to said brake drum, and means for actuating said brake shoes, said means comprising counterpart cam members mounted concentric with the axis of said knuckle opposite the gap between the brake shoes, said cam members being mounted to turn with the knuckle and also being rotatable independently of the knuckle.

4. The combination with an axle having steering knuckles pivotally mounted thereon and wheels journaled on the spindles of said knuckles of brakes for said wheels respectively, each brake comprising a drum mounted on the wheel and brake shoes mounted to turn with the steering knuckle in operative relation to said brake drum, and means for actuating said brake shoes, said means comprising counterpart cam members mounted concentric with the axes of the knuckles respectively opposite the gap between the brake shoes, said cam members being mounted to turn with the knuckles but to a less extent and also being rotatable relatively to each other independently of the knuckles.

5. The combination with an axle having pivotally mounted thereon knuckles that are provided with spindles and rearwardly projecting arms and a cross-rod pivotally connecting the end of said arms, of wheels mounted on said spindles, brake drums mounted on said wheels, and brake shoes mounted to turn with said knuckles in operative relation to said drums, and means for actuating said brake shoes, said means comprising counterpart cam members mounted concentric with the axes of the respective knuckles opposite the gaps between the brake shoes, the cam members of each brake being rotatable relative to each other and independently of the knuckle, one cam member of each brake having an inwardly extending arm and a link connecting said arm to said cross-rod at a distance from its connection with the knuckle arm shorter than the length of the cam arm.

Signed at St. Louis, Missouri, this 25 day of August, 1923.

EDMUND G. HEINZELMAN.